Figure 1:
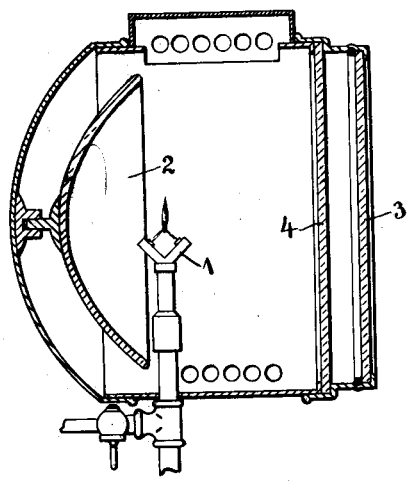

W. CHURCHILL.
HEADLIGHT.
APPLICATION FILED NOV. 25, 1910.

1,034,873.

Patented Aug. 6, 1912.

WITNESSES:
M. E. Verbeck.

INVENTOR
William Churchill
BY
Eugene Diven
ATTORNEY

UNITED STATES PATENT OFFICE.

WILLIAM CHURCHILL, OF CORNING, NEW YORK.

HEADLIGHT.

1,034,873.

Specification of Letters Patent.  Patented Aug. 6, 1912.

Application filed November 25, 1910. Serial No. 594,615.

*To all whom it may concern:*

Be it known that I, WILLIAM CHURCHILL, a citizen of the United States, residing at Corning, in the county of Steuben and State of New York, have invented certain new and useful Improvements in Headlights, of which the following is a specification.

This invention relates to improvements in headlights for locomotives, trolley cars, automobiles, and the like; and my object is to provide a headlight, particularly when of high candle power, in which those light waves, which now render these headlights objectionable, will be cut out from the beam of light projected from the headlight.

It is well known that relatively long light waves, e. g., red and yellow, are transmitted through semi-opaque media more readily than relatively short light waves, e. g., green, blue, and violet. The best known illustration of this fact is the color of the sun or moon when rising or setting, as seen through fog, dust laden atmosphere and smoke. In operating a vehicle of any description provided with a headlight, such as a locomotive, trolley car, automobile, or a motor boat, through fog and smoke, a beam of high candle power is of little or no assistance, for the reason that the glare of light reflected back from the fine particles of fog or smoke into the eyes of the operator renders it impossible to see objects in his path at any distance. I have discovered by experiment that most of the light producing this glare consists of the light waves having the shorter wave lengths. To increase the penetration of headlights in fog and smoke, I propose to use a screen of yellow translucent material, such as yellow tinted glass, which will cut off the shorter wave lengths by absorption, and allow the longer wave lengths to pass through unimpeded. This will reduce the range somewhat under clear weather conditions, but with a headlight of high candle power there is usually more light than is required at such times, while in fog and smoke the light is of little or no value. In using this yellow screen the penetration in fog and smoke can be increased very perceptibly. Furthermore, a yellow light is less glaring by far to the eye than a blue or bluish light, since the iris of the eye contracts and thereby protects the retina when looking at a yellow light, while it contracts very little, if at all, for blue or bluish light. This is a well known physiological principle. A yellow headlight is far less glaring, e. g., less dazzling to an observer looking at or approaching the same than is the case with a white or bluish white light. To one approaching a vehicle carrying a headlight of this character it is absolutely impossible to see beyond or back of the approaching light; whereas, with a yellow screen interposed, the range of vision will pass on beyond the light so that objects back of the approaching vehicle will be discernible.

In carrying out my invention I propose either to make the front glass or the lens of the headlight of the yellow glass, or to interpose either behind or in front of the said glass or lens a separate screen of the yellow glass, which may be made removable, so that the screen may be used or not, as may be desired.

By way of illustrating the application of my invention I have shown in the accompanying drawings sectional views of two types of headlights, in which—

Figure 2:
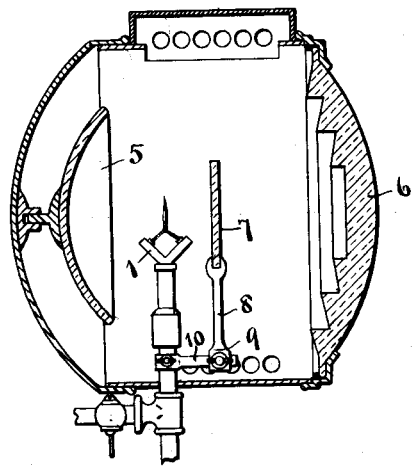

Figure 1 presents a headlight having a parabolic reflector and a simple glass front; and Fig. 2, a headlight having a reflector of glass or metal, and a lens in front.

In Fig. 1 the source of illumination is shown as an acetylene flame issuing from the burner 1, the light rays from which are projected forward from the parabolic reflector 2, the beam of light passing through the simple glass front 3. In carrying out my invention this glass front, instead of being made of clear glass, will be made of a yellow glass of a suitable shade to absorb green, blue, and violet light waves with the least possible effect upon the red and yellow. The yellow glass used by me is transparent and shows transmission of both red and yellow light practically equal to that obtained with an ordinary white glass, and at the same time absorbs all of the blue and violet waves and all of the green of relatively shorter wave length. It is impossible to cut off all of the green, but the more detrimental portion is entirely absorbed. Instead, however, of making this yellow screen permanent in the lamp, I may so construct the lamp that a screen of the yellow glass, as shown at 4, may be removably placed therein, the lamp being so arranged that the screen may be fastened in front of the glass 3, or behind it. As shown in Fig. 1 the screen is positioned behind the front glass, and is adapted to be held in position by the closing of the front door.

In Fig. 2 the burner 1 is properly positioned between a reflector 5 and a lens 6, which, in the illustration is shown to be of the Fresnel type. This lens may be of yellow glass, or a removable screen 7 of the yellow glass may be interposed between the burner and the lens, in the path of the light rays, this screen being mounted within the lamp in such manner that it may be moved to one side, as by mounting it upon an arm 8 pivotally attached to a projection 10, attached to the burner tube, the thumb screw 9 being provided to hold the arm in the desired position upon said projection.

For locomotives in particular, where acetylene or high candle power electric light is to be used in the headlights, it will be preferable to make the front glass or lens of the yellow glass, as there is no reason for providing a removable screen, and the interposition of a second glass medium through which the light must pass has the disadvantage of cutting down the power of the light, and I believe that it will be found preferable in nearly, if not all, cases to use the one medium instead of two.

The advantages of the yellow glass are particularly marked with an arc light or acetylene flame, owing to the large proportion of blue rays present; but it may also be employed to advantage where the blue rays from the source of light are at a minimum, as in a kerosene or other oil flame.

What I claim, therefore, as my invention and desire to secure by Letters Patent is—

1. A headlight provided with a yellow glass screen in the path of the rays of light adapted to transmit practically undiminished the total amount of red and yellow light waves produced by the source of illumination and at the same time to absorb all of the blue and violet waves and all of the green of relatively shorter wave length.

2. A headlight provided with a yellow glass screen adapted to be placed in or out of the path of the rays of light and to transmit practically undiminished the total amount of red and yellow light waves produced by the source of illumination and at the same time to absorb all of the blue and violet waves and all of the green of relatively shorter wave length.

In testimony whereof I have affixed my signature, in presence of two witnesses.

WILLIAM CHURCHILL.

Witnesses:
M. E. VERBECK,
EUGENE DIVEN.